(12) United States Patent
Beekmans et al.

(10) Patent No.: US 12,364,274 B2
(45) Date of Patent: *Jul. 22, 2025

(54) SHAPED VEGETARIAN MEAT PRODUCT

(71) Applicant: Conopco Inc., Englewood Cliffs, NJ (US)

(72) Inventors: Luuk Christianus Hubertus Beekmans, Rotterdam (NL); Leonardus Marcus Flendrig, Vlaardingen (NL); Marc Lemmers, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 145 days.

This patent is subject to a terminal disclaimer.

(21) Appl. No.: 18/306,260

(22) Filed: Apr. 25, 2023

(65) Prior Publication Data

US 2023/0255236 A1 Aug. 17, 2023

Related U.S. Application Data

(62) Division of application No. 16/954,538, filed as application No. PCT/EP2018/083299 on Dec. 3, 2018, now Pat. No. 11,653,671.

(30) Foreign Application Priority Data

Dec. 21, 2017 (EP) .................................... 17209771

(51) Int. Cl.
*A23J 3/22* (2006.01)
*A23J 3/04* (2006.01)
(Continued)

(52) U.S. Cl.
CPC ................. *A23J 3/227* (2013.01); *A23J 3/04* (2013.01); *A23J 3/16* (2013.01); *A23J 3/18* (2013.01);
(Continued)

(58) Field of Classification Search
None
See application file for complete search history.

(56) References Cited

U.S. PATENT DOCUMENTS

| 402,158 A | 4/1889 | Ruton |
|---|---|---|
| 3,711,291 A | 1/1973 | Leidy et al. |

(Continued)

FOREIGN PATENT DOCUMENTS

| CN | 101568268 | 10/2009 |
|---|---|---|
| JP | H05103632 | 4/1993 |
| WO | WO02056701 | 7/2002 |

OTHER PUBLICATIONS

Thesis Applications of Computed Tomography in Dry Cured Meat Products ; 2012; 1-177.

*Primary Examiner* — Patricia A George
(74) *Attorney, Agent, or Firm* — N.V. Nederlandsch Octrooibureau

(57) ABSTRACT

A shaped vegetarian meat product comprising: 30-80 wt. % water; 5-35 wt. % oil, said oil having a solid fat content at 20 degrees Celsius ($N_{20}$) of at least 1.5%; 2-25 wt. % protein selected from algal protein, bacterial protein, dairy protein, egg protein, fungal protein, plant protein, and combinations thereof; 0-40 wt. % of one or more particulate ingredients selected from herbs, spices, vegetables and combinations thereof. Wherein the vegetarian meat product contains at least 4 vol. % of oil droplets having an equivalent spherical diameter in the range of 100 micrometer to 1,000 micrometer as determined by means of micro computed tomography.

5 Claims, 2 Drawing Sheets

Figure 1:
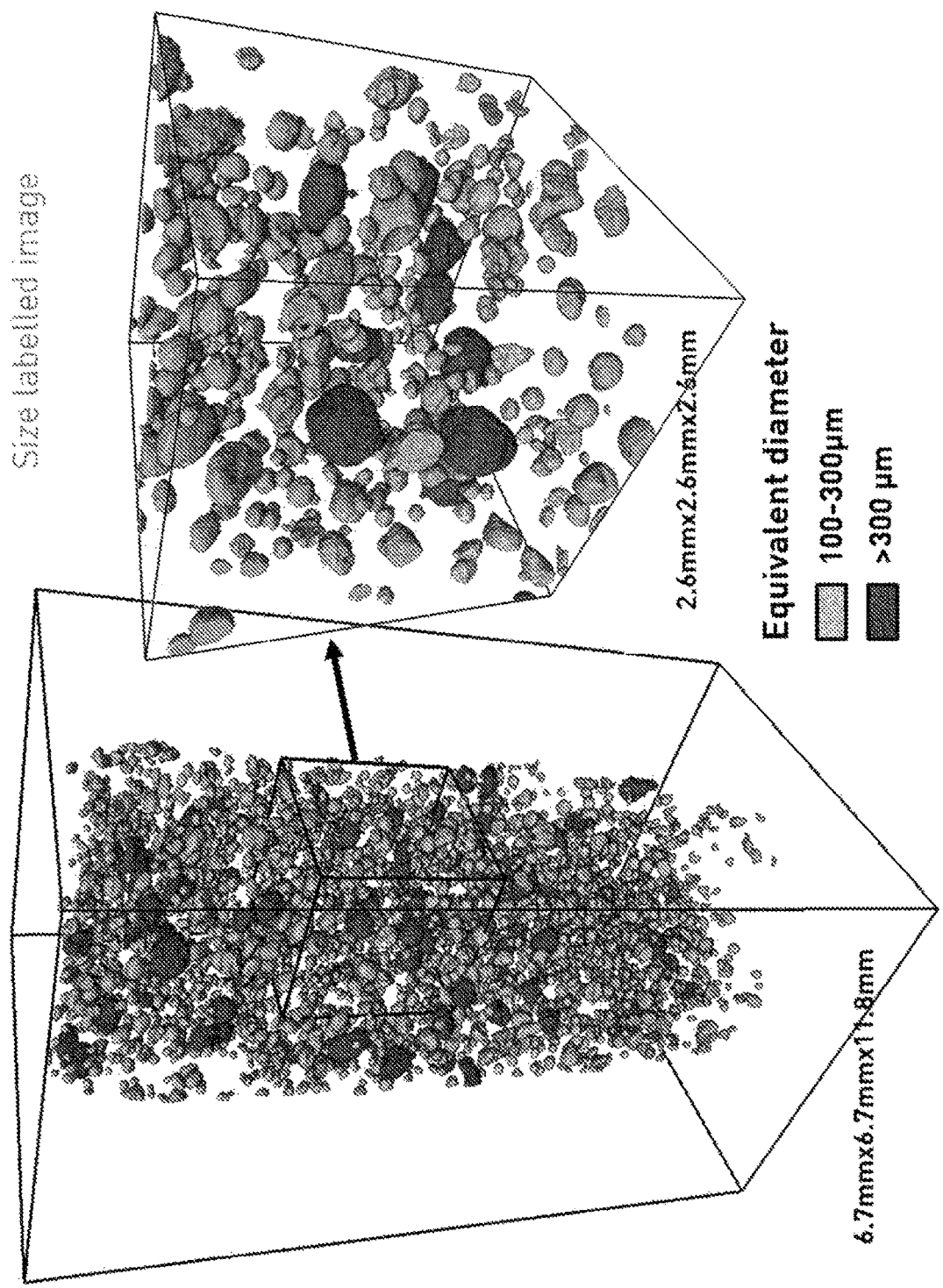

(51) Int. Cl.
    *A23J 3/16*         (2006.01)
    *A23J 3/18*         (2006.01)
    *A23L 27/40*       (2016.01)
    *A23P 30/20*       (2016.01)

(52) U.S. Cl.
    CPC ............. *A23L 27/40* (2016.08); *A23P 30/20* (2016.08); *A23V 2002/00* (2013.01)

(56) References Cited

U.S. PATENT DOCUMENTS

| | | |
|---|---|---|
| 3,719,498 A | 3/1973 | Leidy et al. |
| 3,719,499 A | 3/1973 | Hai et al. |
| 3,886,298 A | 5/1975 | Hayes, Jr. et al. |
| 3,886,299 A | 5/1975 | Feldbrugge et al. |
| 3,919,435 A | 11/1975 | Feldbrugge et al. |
| 3,999,474 A | 12/1976 | Sienkiewicz et al. |
| 4,104,415 A | 8/1978 | Shanbhag et al. |
| 4,143,164 A | 3/1979 | Shanbhag et al. |
| 4,162,332 A | 7/1979 | Sienkiewicz et al. |
| 4,250,198 A | 2/1981 | Millar et al. |
| 4,324,807 A | 4/1982 | Kim et al. |
| 4,376,134 A * | 3/1983 | Kumar .................... A23J 3/227 426/802 |
| 4,563,362 A | 1/1986 | Thomas et al. |
| 2005/0003071 A1 | 1/2005 | Cavallini |
| 2015/0056346 A1* | 2/2015 | Margolis ................. A23J 3/16 426/656 |
| 2015/0099053 A1* | 4/2015 | Kugitani ................ A23L 35/10 426/602 |

\* cited by examiner

SHAPED VEGETARIAN MEAT PRODUCT

FIELD OF THE INVENTION

The present invention relates to a shaped vegetarian meat product comprising:
- 30-80 wt. % water;
- 5-35 wt. % oil, said oil having a solid fat content at 20 degrees Celsius ($N_{20}$) of at least 1.5%;
- 2-25 wt. % protein selected from algal protein, bacterial protein, dairy protein, egg protein, fungal protein, plant protein, and combinations thereof;
- 0-40 wt. % of one or more particulate ingredients selected from herbs, spices, vegetables and combinations thereof.

The vegetarian meat products according to the present invention include vegetarian alternatives for shaped meat products that contain ground meat, such as sausages and patties.

BACKGROUND OF THE INVENTION

Meat is considered the highest quality protein source, not only due to its nutritional characteristics, but also for its appreciated taste. Meat is nutritious, because meat protein contains all essential amino acids for humans. In addition, meat comprises essential vitamins, such as vitamin B12, and is rich in minerals. Meat proteins also greatly contribute to food characteristics by imparting specific functionalities, such as, appearance, texture, and mouthfeel.

However, from a health point of view, an excessive intake of meat products cannot be recommended, because meat contains cholesterol and a high proportion of saturated fatty acids.

Further, due to animal diseases, such as mad cow disease, global shortage of animal protein, a growing consumer demand for religious (halal or kosher) food and for economic reasons, there is an increasing interest in vegetarian meat products that are based on non-meat proteins.

U.S. Pat. No. 4,376,134 describes a process for the production of a sausage analog, said process consisting essentially of:
- providing an aqueous mixture of ingredients comprising 60-80 wt. % water, 15-30 wt. % flavors, 0-6.0 wt. % spices, 0-3.0 wt. % coloring agents;
- providing a dry mixture of ingredients selected from the group consisting of 0-7 wt. % egg white solids, 0-5 wt. % non-fat dry milk, 0-8 wt. % sodium caseinate, 0-5 wt. % sugar and combinations thereof;
- admixing textured protein with the aqueous mixture thereby forming a first admixture;
- forming a second admixture by admixing with said first admixture, 5-30 wt. % of a blend of fats and oils wherein said blend contains equal amounts of (i) a high melting point fat having a melting point in the range 90-110° F., (ii) an intermediate melting point fat having a melting point in the range 70-90° F., and (iii) a low melting point fat or oil which is a liquid at room temperature;
- admixing the dry mixture with the second admixture thereby forming a third admixture;
- adjusting the third admixture to a temperature of 60° F. or lower.

U.S. Pat. No. 4,563,362 describes a meat analogue formed from a composition comprising:
- water,
- protein in an amount of 10-25 wt. %, said protein including an edible coagulable proteinaceous material,
- a hydrocolloid in an amount of 0.05-3 wt. % selected from the group consisting of xanthan gum and locust bean gum, and mixtures thereof,
- a particulate unmodified waxy maize starch of branched chain amylopectin polymers in an amount of 3-30 wt. % and
- a liquid or semiliquid fat or oil in an amount of up to about 45 wt. %.

WO 02/056701 describes a native vegetable protein product which is highly soluble in water and forms a gel with mild heat treatment. Example 5 describes the preparation of two vegetarian meat analogs.

US 2005/0003071 describes process for making a vegetable base meat analogue comprising the steps of:
- adding methylcellulose into a water/ice mix and sequentially blending methyl cellulose and water/ice mix to form a cream;
- blending in a modified gluten;
- blending in a vegetable protein product having high solubility in water and capable of forming a gel with mild heat treatment, forming a protein mixture;
- blending in oil to make an emulsion base;
- blending in a modified food starch and flavoring ingredients to form a flavored emulsion base; and
- cooking the flavored emulsion base to make a vegetable base meat analogue US 2015/0099053 describes an oil-in-water-type emulsion gel food that is obtained by gelling an oil-in-water-type emulsion slurry containing 10-60 wt. % of oil droplets having a particle diameter of 50-800 μm.

US 2015/056346 describes method of producing a plant-based food product, the method comprising:
- (a) hydrating dry plant protein particles with a water solution of one or more flavors and one or more heat denaturable soluble proteins to obtain hydrated plant protein particles;
- (b) adding a binding and thickening water solution to the hydrated plant protein particles so as to create a formable mass;
- (c) adding fat material to the formable mass; and
- (d) after the addition of fat, forming the formable mass or one or more portions thereof into said food product.

One of the major challenges in the field of shaped vegetarian meat products is to achieve a juicy appearance and texture similar to that of their meat-based counterparts.

SUMMARY OF THE INVENTION

The inventors have developed a shaped vegetarian meat product that has a very attractive juicy appearance and texture. The inventors have discovered that the appearance of shaped vegetarian meat products, especially after cutting of the product, is greatly improved if the product comprises a substantial amount of large oil droplets.

Accordingly, a first aspect of the present invention relates to a shaped vegetarian meat product comprising:
- a) 30-80 wt. % water;
- b) 5-35 wt. % oil, said oil having a solid fat content at 20 degrees Celsius ($N_{20}$) of at least 1.5%;
- c) 2-25 wt. % protein selected from algal protein, bacterial protein, dairy protein, egg protein, fungal protein, plant protein, and combinations thereof;
- d) 0-40 wt. % of one or more particulate ingredients selected from herbs, spices, vegetables and combinations thereof;

wherein the vegetarian meat product contains at least 4 vol. % of oil droplets having an equivalent spherical diameter in the range of 100 micrometer to 1,000 micrometer as determined by means of micro computed tomography.

A vegetarian meat product comprising a substantial amount of large oil droplets can be produced by first preparing a proteinaceous slurry, followed by mixing said slurry with a substantial quantity of oil that contains a significant amount of solid fat. By adding the oil after the protein has been thoroughly mixed with water, break-up of the oil droplets to droplet sizes of substantially less than 100 µm can be minimised because the high viscosity of the proteinaceous slurry prevents such break-up and because not much shear is required to homogeneously disperse the large oil droplets through the proteinaceous slurry. In addition, the use of oil containing solid fat when it is mixed with the other ingredients offers the advantage that this oil is more viscous than oils that do not contain any solid fat. This higher viscosity also counteracts break-up of the oil into small droplets and thus facilitates preparation of a product containing large oil droplets.

Accordingly, a second aspect of the invention relates to a process of preparing the shaped vegetarian meat product according to the present invention, said process comprising the steps of:
  i) mixing protein and water to produce a homogeneous slurry, said protein being selected from algal protein, bacterial protein, dairy protein, egg protein, fungal protein, plant protein, and combinations thereof;
  ii) mixing the slurry with oil to produce a vegetarian meat product mass, wherein the mixing of the slurry with the oil is carried out at a temperature x at which the oil has a solid fat content ($N_x$) of at least 1%; and
  iii) shaping the vegetarian meat product mass.

A third aspect of the invention relates to a method of preparing a ready-to-eat vegetarian meat product, said method comprising heating the vegetarian meat product according to the present invention to a temperature of at least 60° C.

DETAILED DESCRIPTION OF THE INVENTION

The present invention relates to a shaped vegetarian meat product comprising:
  a) 30-80 wt. % water;
  b) 5-35 wt. % oil, said oil having a solid fat content at 20 degrees Celsius ($N_{20}$) of at least 1.5%;
  c) 2-25 wt. % protein selected from algal protein, bacterial protein, dairy protein, egg protein, fungal protein, plant protein, and combinations thereof;
  d) 0-40 wt. % of one or more particulate ingredients selected from herbs, spices, vegetables and combinations thereof;
  wherein the vegetarian meat product contains at least 4 vol. % of oil droplets having an equivalent spherical diameter in the range of 100 micrometer to 1,000 micrometer as determined by means of micro computed tomography.

The term "vegetarian meat product" as used herein refers to a product that does not contain meat, meat fat or meat protein that is obtained from animals, including fish. The vegetarian meat product of the present invention can contain fat or protein obtained from milk or eggs.

The term "shaped" as used herein in relation to vegetarian meat product means that the vegetarian meat product has been prepared in a predefined form that is retained after preparation. Shaping of the vegetarian meat product may be achieved by e.g. extrusion (and cutting) or moulding.

Whenever reference is made to the protein content of the vegetarian meat product, unless indicated otherwise, this does not include protein that is contained in the one or more particulate ingredients.

The term "oil" as used herein refers to glycerides selected from triglycerides, diglycerides, monoglycerides, phosphoglycerides and combinations thereof. The term "oil" encompasses oils that are liquid at ambient temperature as well as oils that are solid or semi-solid at ambient temperature.

The volume percentage of oil droplets having an equivalent spherical diameter in the range of 100 micrometer to 1,000 micrometer, expressed as a percentage of the volume of the vegetarian meat product, is determined by means of micro computed tomography using the procedure that is described in the Examples.

The solid fat content at a temperature of x degrees Celsius ($N_x$) can suitably be determined using ISO 8292-1 (2012).

Whenever reference is made to the water content of the vegetarian meat product, this includes both free and bound water.

The shaped vegetarian meat product according to the present invention preferably is a sausage or a patty. Most preferably, the shaped vegetarian meat product is a sausage.

The shaped vegetarian meat product typically has a unit weight in the range of 5-500 grams, more preferably of 10-450 grams and most preferably of 15-400 grams.

The combination of water, oil, the protein and the one or more particulate ingredients typically constitutes at least 80 wt. %, more preferably at least 85 wt. % and most preferably at least 88 wt. % of the shaped vegetarian meat product.

The water content of the vegetarian meat product preferably is in the range of 40 wt. % to 70 wt. %, more preferably of 50 wt. % to 65 wt. %.

The oil content of the product is preferably in the range of 10 wt. % to 32 wt. %, more preferably 15 wt. % to 30 wt. %.

According to a particularly preferred embodiment, the oil contained in the product has a solid fat content at 20 degrees Celsius ($N_{20}$) of not more than 20%, more preferably of 2-10% and most preferably of 2.5-8%. The inventors have found that in comparison to oils that are completely liquid at 20 degrees Celsius, oils containing some solid fat at 20 degrees Celsius improve the storage stability of the shaped vegetarian meat product.

According to another preferred embodiment, the oil in the product has a solid fat content at 30 degrees Celsius ($N_{30}$) of 1-10%, more preferably of 1.5-8% and most preferably of 2-7%.

The shaped vegetarian meat product preferably contains at least 5 vol. %, more preferably at least 6 vol. % of oil droplets having an equivalent spherical diameter in the range of 100 micrometer to 1,000 micrometer as determined by means of micro computed tomography.

Preferably, the shaped vegetarian meat product contains at least 1 vol. %, more preferably at least 2 vol. % of oil droplets having an equivalent spherical diameter in the range of 200 micrometer to 900 micrometer as determined by means of micro computed tomography.

In another preferred embodiment, the shaped vegetarian meat product contains at least 0.8 vol. %, more preferably at least 1.5 vol. % of oil droplets having an equivalent spherical diameter in the range of 300 micrometer to 800 micrometer as determined by means of micro computed tomography.

The oil in the shaped vegetarian meat product preferably contains 80-98 wt. % of a liquid vegetable oil selected from the group of sunflower oil, soybean oil, rapeseed oil, cottonseed oil, maize oil, olive oil, and combinations thereof and 2-20 wt. % of a high melting oil selected from hydrogenated vegetable oil, palm stearin, palm mid fraction, palm kernel stearin, coconut stearin, butter oil, butter stearin and combinations thereof. More preferably, the oil contains 90-97.5 wt. % of the liquid vegetable oil and 2.5-10 wt. % of the high melting oil.

The shaped vegetarian meat product preferably contains 4-20 wt. % protein, more preferably 6-18 wt. % protein. Preferably, the shaped vegetarian meat product contains at least 4 wt. %, more preferably at least 6 wt. % protein selected from egg white protein, soy protein, wheat protein, oat protein, bran protein and combinations thereof. Even more preferably, the product contains at least 4 wt. %, more preferably at least 6 wt. % protein selected from egg white protein and wheat protein.

According to a particularly preferred embodiment, the product comprises a combination of plant protein and egg protein, said plant protein preferably being selected from the group consisting of soy protein, cereal protein, rapeseed protein, cottonseed protein, sunflower protein, sesame protein, legume protein, lupin protein, potato protein and algae protein and combinations thereof; and said egg protein being selected from egg yolk protein, egg white protein and combinations thereof. Preferred plant proteins are soy protein, wheat protein, oat protein, bran protein and combinations thereof. More preferred plant proteins are soy protein, wheat protein and combinations thereof. The egg protein employed preferably is egg white protein.

The vegetarian meat product preferably contains 1-20 wt. %, more preferably 2-15 wt. % and even more preferably 3-10 wt. % of the one or more particulate ingredients.

Examples of other ingredients that may suitably be incorporated in the shaped vegetarian meat product of the present invention include salt, sugars, acids, polysaccharides, vitamins, minerals, flavourings, colourings, preservatives and emulsifiers.

Typically, the vegetarian meat product contains 0.3-8 wt. %, more preferably 0.4-5 wt. % of salt selected from sodium chlorides, potassium chloride and combinations thereof.

A particularly preferred embodiment of the shaped vegetarian meat product is a product comprising:
a) 50-65 wt. % water;
b) 15-30 wt. % oil;
c) 6-18 wt. % protein selected from dairy protein, egg protein, fungal protein, plant protein, and combinations thereof;
d) 2-15 wt. % of one or more particulate ingredients selected from herbs, spices, vegetables and combinations thereof;
wherein the vegetarian meat product contains at least 6 vol. % of oil droplets having an equivalent spherical diameter in the range of 100 micrometer to 1,000 micrometer as determined by means of micro computed tomography. Especially preferred is such a product, wherein the oil has a solid fat content at 20 degrees Celsius ($N_{20}$) of 2.5-8%.

Another aspect of the invention relates to a process of preparing a shaped vegetarian meat product according to the present invention, said process comprising the steps of:
i) mixing protein and water to produce a homogeneous slurry, said protein being selected from algal protein, bacterial protein, dairy protein, egg protein, fungal protein, plant protein, and combinations thereof;
ii) mixing the slurry with oil to produce a vegetarian meat product mass, wherein the mixing of the slurry with the oil is carried out at a temperature x at which the oil has a solid fat content ($N_x$) of at least 1%; and
iii) shaping the vegetarian meat product mass.

As explained herein before, by adding the oil after the protein has been thoroughly mixed with water, break-up of the oil droplets to equivalent spherical diameters of substantially less than 100 μm can be minimised because of the high viscosity of the proteinaceous slurry prevents such break-up and because not much shear is required to homogeneously disperse the large oil droplets through the proteinaceous slurry. As explained herein before, break-up into small droplets can also be counteracted by employing an oil that contains some solid fat when it is mixed the slurry.

Preferably the mixing of the slurry with the oil is carried out at a temperature x at which the oil has a solid fat content ($N_x$) of at least 2%, most preferably of at least 3%.

The invention also encompasses processes in which the protein slurry already contains emulsified oil before said slurry is mixed with the oil in step ii) of the process. Especially in case of shaped vegetarian meat products having a high oil content it can be advantageous to incorporate some of the oil in finely emulsified form into the protein slurry and to subsequently mix the protein slurry with additional oil to ensure that this additional oil is distributed throughout the product as coarse oils droplets, i.e. droplets having an equivalent spherical diameter of at least 100 microns.

The protein is preferably in the form of a powder when mixed with the water.

Preferably the mixing of the protein and water is carried out in a bowl chopper.

In one preferred embodiment of the preset process that is particularly suited for the production of sausages, the process comprises the following steps:
extruding the vegetarian meat product mass; and
packaging the extruded vegetarian meat product mass in a sealed package.

Prior to packaging, the extruded vegetarian meat product mass is preferably heated to a temperature of at least 60 degrees Celsius, more preferably of at least 70 degrees for at least 1 minute to denature proteinaceous components and to thereby form a solidified mass. In case the vegetarian meat product mass is extruded into a casing, the casing can easily be removed after said mass has been solidified by the heat treatment.

After or before solidification, the extruded vegetarian meat product mass may be cut in to pieces. In this way both sausages and patties can be prepared.

Preferably, the process according to this embodiment comprises the further step:
pasteurizing or sterilizing the extruded vegetarian meat product mass within the sealed package.

In an alternative preferred embodiment, the process comprises the following steps:
forming the vegetarian meat product mass into a patty; and
packaging the patty in a sealed package.

Also the formed patty is preferably heated to a temperature of at least 60 degrees Celsius, more preferably of at least 70 degrees for at least 1 minute to denature proteinaceous components and to thereby solidify the patty.

Preferably, this embodiment comprises the further step:
iii) pasteurizing or sterilizing the patty within the sealed package.

The packaging of the vegetarian sausage or the vegetarian patty in a sealed package may suitably be done by packaging these products in a vacuum bag made of a synthetic packaging film (e.g. polyethylene, polypropylene, polyester, polyamide), followed by sealing of the bag.

Yet another aspect of the invention relates to a method of preparing a ready-to-eat shaped vegetarian meat product, said method comprising heating a shaped vegetarian meat product according to the present invention to an internal temperature of at least 60° C. The heating of the vegetarian meat product can be done in various ways. Examples of suitable heating methods include contacting with hot (e.g. boiling) water, microwave heating, shallow frying and deep frying.

The invention is further illustrated by the following non-limiting examples.

EXAMPLES

Example 1

Smoked sausages were prepared on the basis of the recipe shown in Table 1.

TABLE 1

| Ingredients | Wt. % |
| --- | --- |
| Water | 57.2 |
| Rapeseed oil | 24.5 |
| High melting fat[1] | 0.9 |
| Salt | 0.6 |
| Protein mix[2] | 11.8 |
| Taste giving ingredient mix[3] | 4.5 |
| Colourants | 0.7 |
| TOTAL | 100.0 |

[1]Fully hardened palm oil
[2]Mixture of wheat protein and (predominantly) egg white protein
[3]Herbs, spices and flavouring Sausages were prepared by the following procedure:
Half of the total amount of oil and the full amount of high melting fat were heated and subsequently mixed to make sure all the high melting fat was homogeneously distributed throughout the oil phase. This blend was quiescently cooled to room temperature overnight and used the next day.
All ingredients except the oil blend were added to the water and mixed in a bowl chopper (65 L, LASKA, Austria, fitted with 6 knives of 4-cut shape) at a reduced pressure of 0.4 bars and at ambient temperature until visually homogeneous.
The first half of the oil was added and mixed at a pressure of 0.4 bars at medium shear setting, at ambient temperature and until visually homogeneous.
The oil blend was added and mixed at a pressure of 0.4 bars at low shear setting, at ambient temperature and until visually homogeneous.
The vegetarian meat product mass was transferred into non-edible cellulose casings to obtain a sausage shaped product.
The sausage shaped product was pasteurized at 85° C. for 45 minutes.
The sausages were dried for 90 minutes at 46° C.
The sausages were smoked in a smoking chamber for 90 minutes at 46° C.
After smoking the cellulose casing was removed by hand.
The sausages were vacuum sealed in plastic.

Figure 2:
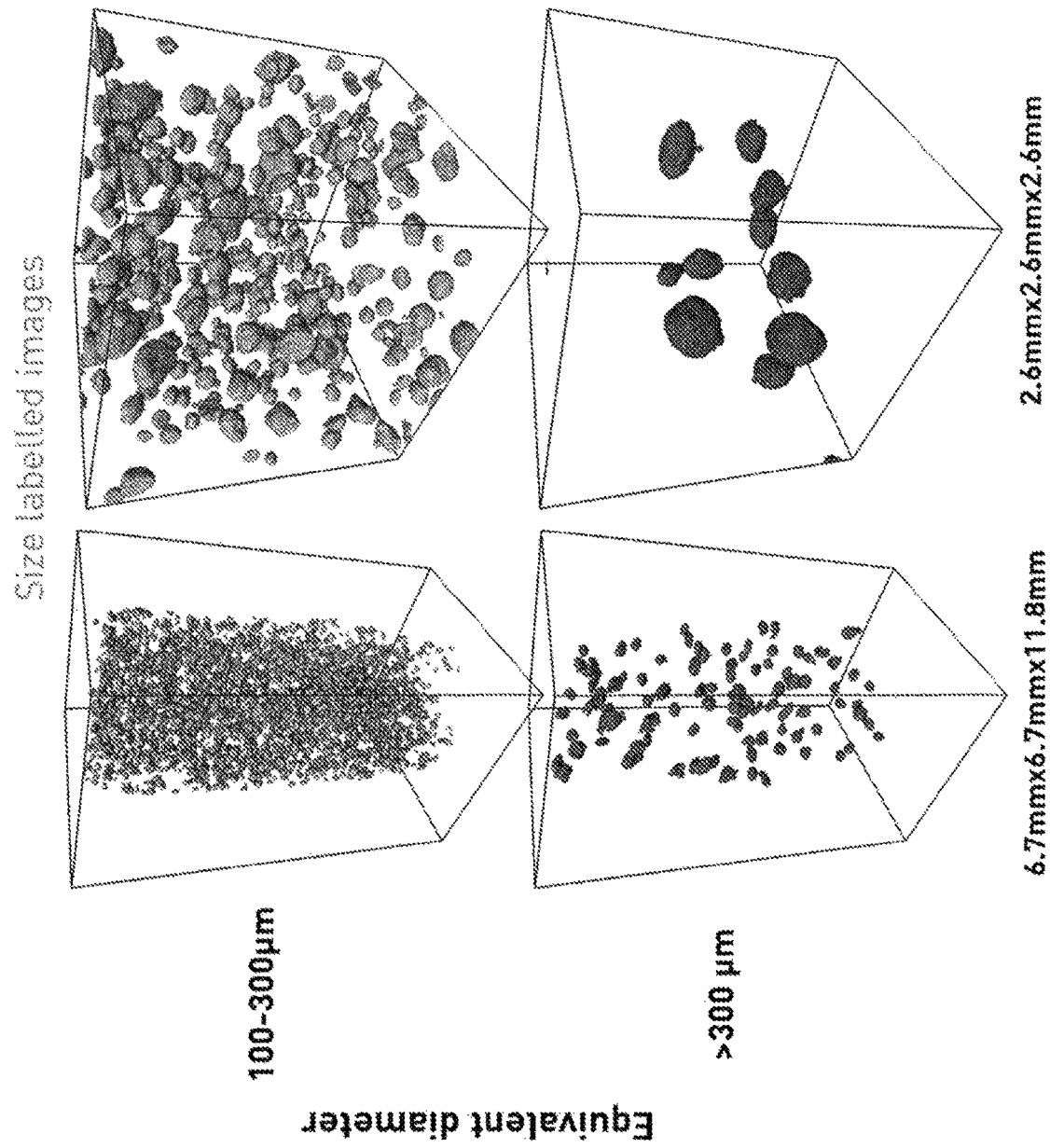

The microstructure of the sausages so prepared was analysed by means of micro computed tomography according to the following method:
Small cylinders of the samples were obtained by punching an apple corer into the (vegetarian) sausage surface. The size was approximately 5 mm in diameter and the height ranged from 7-10 mm. A plastic tube with an inner diameter of 6 mm was used as a protective container during scanning (to avoid loss of moisture). A micro-positioning stage was used to achieve exact positioning of the sample tube in the middle of the scanning field.
Samples were imaged using a Skyscan 1172-G desktop micro-CT system with a 100 kV X-ray source (10 W, 20-100 kV, 0-250 µA, <5µ spot size) and a 11 Mp Ximea X-ray detector (4000*2664 pixels). The following settings were applied: Source 60 kV/167 µA, pixel size 1.82 µm, step size of 0.20° over 360 degrees and frame averaging of 3. No binning was used. The average scan time was about 2 hours and 40 minutes per scan, and yields 1800 projection images/scan. The samples were scanned using 2 scans, connected in the vertical direction to increase the axial field-of-view (oversized scan) and subsequently merged together during the reconstruction.
A stack of approximately 6500 horizontal cross sections with a size of approximately 3700×3700 pixels was obtained after tomographic reconstruction of the projection images. A beam hardening correction of 40%, ring artefact correction of 20 were selected. Smoothing was set to 4.
For image analysis and 3D visualisation of the micro-CT images, AvizoFire 9.2 software from ThermoFisher—Visualization Sciences Group was used. The sample holder was removed by using binary masking. Oil was identified using grey level thresholding: creating a binary image by selecting pixels that belong to true foreground regions with intensities higher than a predefined value (threshold) and background regions with intensities lower than this value. After thresholding, the following image processing steps were used: i) separation of touching particles, ii) removing particles touching the lower and upper edge, and iii) generation of a size distribution and calculation of mean particle diameters. For segmentation, a watershed transform of the Euclidean distance map was used. In Avizo Fire a build in function was used combining both procedures.
The size of the identified oily particles is expressed as the equivalent spherical diameter. This is the diameter of a sphere having the same volume as the oily particle. The volume of the oily particles equals the number of pixels within the particle, which is straightforwardly determined by counting. The equivalent spherical diameter is not only used for particles approaching a spherical shape, but also for irregular particles.
FIGS. 1 and 2 show size labelled binary images that were produced by the micro CT scan. FIG. 1 shows the oil droplets having an equivalent spherical diameter of 100 microns or more. FIG. 2 separately shows the oil droplets having an equivalent spherical diameter in the range of 100 to 300 microns and the oil droplets having an equivalent spherical diameter of more than 300 microns.
The micro CT analysis showed that the sausages contained 7.9 vol. % of oil droplets having an equivalent spherical diameter of more than 100 microns and 1.9 vol. % of oil droplets having an equivalent spherical diameter of more than 300 microns.

Comparative Example A

Smoked sausages were prepared on the basis of the recipe shown in Table 2.

TABLE 2

| Ingredients | Wt. % |
|---|---|
| Water | 58.8 |
| Rapeseed oil | 25.2 |
| Salt | 0.6 |
| Protein mix[1] | 9.8 |
| Taste giving ingredient mix[2] | 4.6 |
| Colourants | 0.7 |
| Polysaccharides[3] | 0.3 |
| TOTAL | 100.0 |

[1]Mixture of wheat protein and (predominantly) egg white protein
[2]Herbs, spices and flavouring
[3]Contains predominantly konjac gum and some carrageenan The sausages were prepared in the same way as the sausages in Example 1, except that no vacuum was applied during mixing and that the medium shear setting was applied also after the second oil addition step.

Micro CT analysis showed that the sausages contained less than 0.1 vol. % of oil droplets having an equivalent spherical diameter of more than 100 micrometer.

Example 2

The sausages described in Example 1 and Comparative Example A were evaluated by a trained sensory panel.

The panel had been trained to score the intensity of attributes on an absolute scale ranging from 0-15. Using absolute scaling enables comparison of attribute scores.

The trained sensory panel consisted of 12 panel members, selected according to ISO 8586 standards. The samples were offered sequential monadic and blind with 3-digit codes. White light conditions were applied. A mean score was calculated, for each attribute for every product. The samples were heated in a vacuum-bag for 15 minutes in hot water (90° C.). After heating, the samples were offered directly to the panelists.

The panelists cut the sausage, using sharp and similar knives, and visually evaluated the inside of the sausage for the degree of visible moisture from either fat and or water. A lower score indicates less visible moisture and a higher score indicates more visible moisture.

After visual evaluation by the panelists, the samples were tested for their organoleptic attributes. One of the texture attributes is labelled as 'dry/rough after feel'. This attribute describes the degree of a dry/rough after feel and is judged after the product has left the mouth. A lower score indicates less dry/rough after feel in the mouth, while a higher score indicates a more dry/rough after feel in the mouth.

As a reference sample the panel also evaluated a commercial pork meat sausage, type "Unox® magere rookworst" (Unox® light smoked sausage).

The average panel scores for the three sausages tested are shown in Table 3.

TABLE 3

|  | Unox® light smoked sausage | Sausage of Example 1 | Sausage of Comparative Example A |
|---|---|---|---|
| Moist appearance | 8.2 * | 8.0 * | 3.1 |
| Dry/rough after feel | 3.2 | 3.8 | 5.6 |

* Not significantly different.

Example 3

Vegetable patties were prepared on the basis of the recipes shown in Table 4:

TABLE 4

| Ingredients | Patty A | Patty 1 |
|---|---|---|
| Water | 59.5 | 59.5 |
| Rapeseed oil | 20 | 19.4 |
| High melting fat[1] | — | 0.6 |
| Isolated soy protein[2] | 10 | 10 |
| Pregelatinized chickpea flour[3] | 10 | 10 |
| Salt | 0.5 | 0.5 |
| TOTAL | 100 | 100 |

[1]Fully hardened palm oil
[2]SUPRO 620 IP, ex Solae, USA
[3]ex. La Veronese, Italy Vegetable patty A was prepared as follows:

Water and isolated soy protein were mixed in a Stephan mixer (UMC 5 electronic, standard 2 knives mixing tool) at 1000 rpm for 2 minutes at a reduced pressure of 0.1 bar.

Rapeseed oil was added and mixed at 1000 rpm for 2 minutes at a reduced pressure of 0.1 bar.

Finally, chickpea flour and salt were added and mixed at 1000 rpm for 2 minutes at a reduced pressure of 0.1 bar.

1 kg of this mixture was then transferred in a plastic piping bag (type 7004 comfort green, One Way Plastics B.V., Oosterhout, The Netherlands) and the content was extruded into a transparent polypropylene beaker (internal dimensions: diameter bottom 90 mm, diameter top 106 mm, height 130 mm), which served as casing.

The beaker was closed with a plastic lid and placed in a water bath at 92° C. for 1 hour. Subsequently the product was allowed to cool to ambient temperature.

In a final step, the product was deposited on a plate to be cut in 1 cm thick patties.

Vegetable patty 1 was prepared in the same way as vegetable patty A, except that i) instead of rapeseed oil a homogeneous blend of rapeseed oil and high melting fat was added, and ii) that this oil blend was mixed with the water and soy protein mixture at 300 rpm instead of 1000 rpm.

Before evaluation, both types of patties were heated on a ceramic dinner plate in a microwave oven (Menumaster® RCS511DSE, ACP, inc.) at 1100 Watt. At intervals, the oven was stopped, and core temperature of the vegetable patty was measured until it was above 60° C. Each patty was then cut in half with a knife and the cut surface was evaluated for its moist appearance by a panel.

The inside of the vegetable patty A showed no visible moisture, and did not have a juicy appearance. In contrast thereto, the inside of patty 1 showed visible moisture and had a juicy appearance.

The oil droplet distribution of the vegetable patties A and 1 was analysed by means of micro computed tomography according to the method described in Example 1. The analysis showed that patty A contained less than 0.1 vol. % of oil droplets having an equivalent spherical diameter of more than 100 micrometer, whereas patty 1 contained 13.2 vol. % of oil droplets having an equivalent spherical diameter of more than 100 microns and 8.1 vol. % of oil droplets having an equivalent spherical diameter of more than 300 microns.

The invention claimed is:

1. A process of preparing a vegetarian meat product, comprising:
  a) 30-80 wt. % water;
  b) 5-35 wt. % oil comprising:

80-98 wt. % of a liquid vegetable oil selected from the group of sunflower oil, soybean oil, rapeseed oil, cottonseed oil, maize oil, olive oil, and combinations thereof; and 2-20 wt. % of a high melting oil selected from hydrogenated vegetable oil, palm stearin, palm kernel stearin, palm mid fraction, coconut stearin, butter oil, butter stearin and combinations thereof;

wherein the oil has a solid fat content at 20 degrees Celsius ($N_{20}$) of 1.5-20 wt. %; and c) 2-25 wt. % protein;

said process comprising the steps of:

i) mixing protein and water to produce a homogeneous slurry;

ii) mixing the slurry with oil to produce a vegetarian meat product mass, wherein the mixing of the slurry with the oil is carried out at a temperature at which the oil has a solid fat content ($N_{20}$) of 1.5-20 wt. %.

2. The process of claim 1, wherein step i) further includes mixing emulsified oil with the protein and water.

3. The process of claim 1, and further comprises heating the vegetarian meat product mass to a temperature of at least 60 degrees Celsius.

4. The process of claim 1, and further comprising: iii) shaping the vegetarian meat product mass.

5. The process according to claim 3, wherein the shaping comprises the following steps:

extruding the vegetarian meat product mass; and packaging the extruded vegetarian meat product mass.

\* \* \* \* \*